R. G. & L. CATOR.
FIFTH WHEEL.
APPLICATION FILED SEPT. 9, 1907.
909,755.
Patented Jan. 12, 1909.
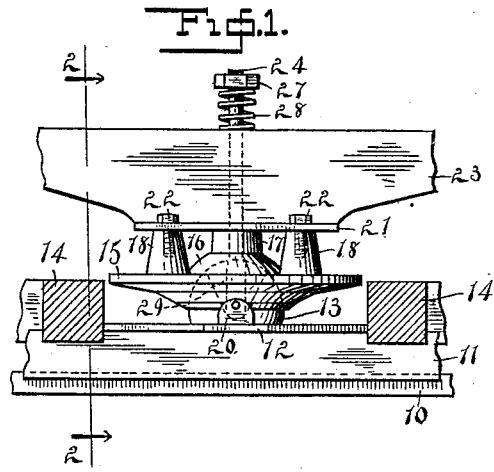
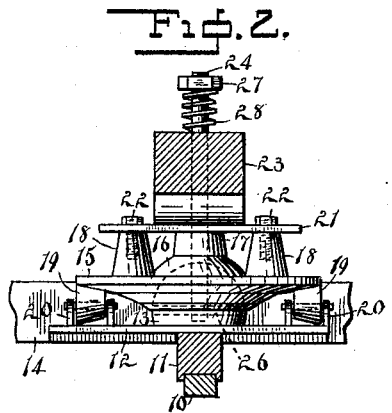
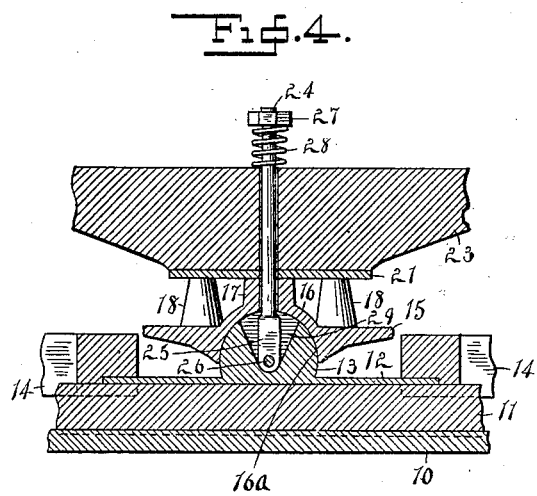
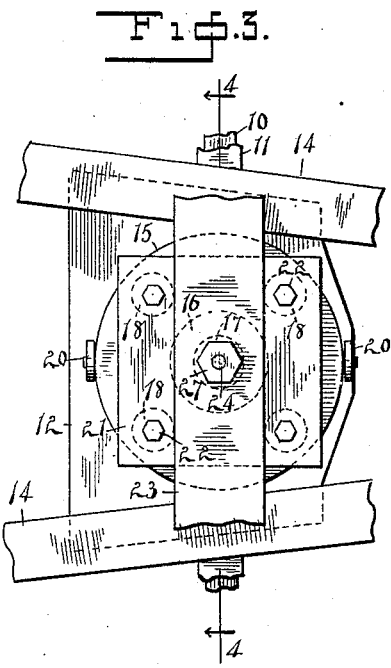
WITNESSES:
Mathew J. Martz
Chas. F. Bassett
INVENTORS
Richard G. Cator
Leon Cator
By Frederick Benjamin
ATT'Y.
THE NORRIS PETERS CO., WASHINGTON, D. C.

UNITED STATES PATENT OFFICE.

RICHARD G. CATOR AND LEON CATOR, OF PALMYRA, NEW YORK.

FIFTH-WHEEL.

No. 909,755.    Specification of Letters Patent.    Patented Jan. 12, 1909.

Application filed September 9, 1907. Serial No. 391,903.

*To all whom it may concern:*

Be it known that we, RICHARD G. CATOR and LEON CATOR, of the United States, residing at Palmyra, in the county of Wayne and State of New York, have invented certain new and useful Improvements in Fifth-Wheels, of which the following is a specification.

This invention relates to vehicles, and refers especially to improvements in the coupling connecting the reach with the front axle, and commonly referred to as the "fifth wheel."

The chief objects of the invention are to provide a simple, strong and durable fifth wheel connection for vehicles of all descriptions requiring such a device; to furnish a coupling that will yield readily to the lateral rotation of the axle around the king bolt, and also to the oscillation of the axle in a vertical plane; to afford means for resisting any tendency of the axle to oscillate in other directions, and especially to maintain the axis of the coupling in a plane at right angles to the length of the reach.

Further objects of this improved coupling are to supply bearing rollers which will maintain their proper relation with the axle at whatever angle it may assume and thus lessen the friction; to protect the bearing surfaces from dirt; and to supply a coupling having few parts and of such design as to be economically manufactured and that can be readily repaired if broken.

We accomplish the above important results by means of the appliance illustrated in the accompanying drawing which forms a part of this application and in which:—

Figure 1 is a front elevation of our improved fifth-wheel coupling, the friction rollers being removed; Fig. 2 is a sectional view taken on the line 2—2 of Fig. 1 with the friction rollers in place; Fig. 3 is a top plan view; and: Fig. 4 is a sectional view on the line 4—4 of Fig 3.

Referring more in detail to the drawing, the numeral 10 indicates the front axle of a wagon, 11 the axle reinforcement, and 12 a base plate which rests upon said reinforcement, and has a hemispherical boss or ball 13 located at the center of the upper face and preferably cast integral with said plate. The said margins of the plate are extended beneath the hounds 14 which have gains or notches upon the under side to receive the plate and thus hold it securely in position.

A bearing plate 15, circular in outline, is provided with a central dome-shaped portion 16, concaved on the under side to form a socket 16$^a$, which fits over the boss 13 and with the latter forms a joint in which the connected parts can move in one plane only, being limited by devices which will be described hereinafter.

From the center of the dome 16 extends a pillar 17, and arranged at spaced intervals about said pillar are posts 18. The plate 15 is supported by two oppositely arranged friction rollers 19, journaled in bearings 20. The said rollers prevent the axle from turning over when the wheels strike an obstruction, and are made conical to avoid friction from slip. The lower face of the socket plate 15 is inclined to correspond with the bevel of the rollers.

A rectangular bridge plate 21 is supported on the pillar 17 and posts 18 and is secured to said posts by lag bolts 22. The front bolster 23 rests directly upon the said plate 21, and is secured thereto in any suitable manner common in vehicle construction.

A king-bolt 24 passes through the bolster 23, plate 21, pillar 17, and its lower end 25 is flattened and received in a V shaped slot 29 in the boss 13, its extremity being pivoted on a transverse pin 26 extending through the slot and fixed in the boss. The end walls of said slot diverge from below upward, as shown in Fig. 4 to allow of considerable lateral movement of the king-bolt, the walls of said slot, however, being parallel so that there can be no movement in a longitudinal plane. The king-bolt extends above the bolster 23 and is supplied with a nut 27 on its upper end. Between this nut and the bolster 23 is interposed an expansion spiral spring 28, which permits the plate 15 to move upon the boss 13, without binding or straining the thread of the king-bolt. This construction will also avoid excessive shocks and strains on the bolt when the vehicle is subjected to severe jolts, or if one wheel is elevated or depressed to a sufficient extent to cause the bearing surfaces of the ball and socket joint to part company.

Having thus described our invention, what we claim as new is:—

1. In a fifth-wheel, a bolster, a bolster-plate consisting of a bearing-plate provided with a socket, posts carried on said plate, and a bridge-plate supported on said posts, an axle, an axle plate, a boss on the axle-plate engaging said socket, said boss having a slot extending parallel with the axle, a king-bolt having a flattened end engaging said slot, pivotal connection between the king bolt and said boss.

2. In a fifth-wheel, a bolster, a bolster-plate consisting of a bearing-plate provided with a socket, posts carried on said plate and a bridge-plate supported on said posts, an axle, a boss on said axle engaging said socket, said boss having a slot extending parallel with the axle, a king-bolt having a flattened end engaging said slot, a pivot-pin connecting the king-bolt to the boss, rollers interposed between the bearing-plate and the axle, and a spring beneath the head of the king-bolt.

In testimony whereof we affix our signatures in the presence of two witnesses.

RICHARD G. CATOR.
LEON CATOR.

Witnesses:
CHARLES C. CONGDON,
FRED GRIFFITH.